United States Patent
Benkual

(10) Patent No.: US 11,308,572 B1
(45) Date of Patent: Apr. 19, 2022

(54) METHOD AND SYSTEM FOR INVISIBLE WATERMARKING OF IMAGES AND VIDEO

(71) Applicant: Xilinx, Inc., San Jose, CA (US)

(72) Inventor: Jack Benkual, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 277 days.

(21) Appl. No.: 16/743,636

(22) Filed: Jan. 15, 2020

Related U.S. Application Data

(60) Provisional application No. 62/793,042, filed on Jan. 16, 2019.

(51) Int. Cl.
*G06T 1/00* (2006.01)
*H04N 19/467* (2014.01)

(52) U.S. Cl.
CPC ........... *G06T 1/005* (2013.01); *H04N 19/467* (2014.11); *G06T 2201/0051* (2013.01)

(58) Field of Classification Search
CPC ............ G06T 1/005; G06T 2201/0051; H04N 19/467
See application file for complete search history.

(56) References Cited

U.S. PATENT DOCUMENTS

2004/0258243 A1* 12/2004 Shin ................... H04N 1/32165
380/210

* cited by examiner

*Primary Examiner* — Christopher Wait
(74) *Attorney, Agent, or Firm* — Goodwin Procter LLP

(57) ABSTRACT

Methods and systems for invisible watermarking of images and video are disclosed. According to one embodiment, a method for watermarking video comprises selecting a block corresponding to a subset of pixels in a video frame. The block has quantized coefficients generated during encoding of the block. A modification function is applied to a candidate quantized coefficient (QC) in the block to incorporate a bit of a watermark message. The modification function is based on a set of configuration parameters.

30 Claims, 6 Drawing Sheets

METHOD AND SYSTEM FOR INVISIBLE WATERMARKING OF IMAGES AND VIDEO

CROSS REFERENCE TO RELATED APPLICATIONS

This application claims priority to and benefit of U.S. Provisional Patent Application No. 62/793,042, entitled "Method and System for Invisible Watermarks using Quantized Coefficients," filed on Jan. 16, 2019, the entire contents of which are incorporated herein by reference.

FIELD

This disclosure generally related to encoding of images and video and, in particular, to methods and systems for invisible watermarking of images and video.

BACKGROUND

In conventional watermarking, a peculiar symbol or a phrase is embedded in stationery (e.g., blank paper, letterhead, etc.), during manufacturing thereof so that the source of the materials printed on the stationery can be readily identified, and/or the authenticity of the documents can be readily verified. Digital watermarking generally serves the same purpose—it can identify the source of digital content and/or may be used to authenticate the content. Watermarks in images and videos can also be used to provide copyright notices. Unlike stationery watermarks, which are almost always visible, digital watermarks can be visible or "invisible." In this context, invisible generally means not readily visible when the image or video is displayed or at least not perceptible to the observer. Detection and extraction of an invisible watermark in an image/video requires specialized processing of the image/video. The invisible watermark may be used for various purposes such to authenticate the image/video, to determine if the image/video has been altered, or to include a copyright, etc.

For the sake of convenience, digital images and videos are referred to in the discussion below as video. Raw video data tends to be very large (on the order of several megabytes, hundreds of megabytes, etc.) and, as such, video data is rarely transmitted and/or stored in the raw form. Rather, the video is encoded and compressed. A watermark can be embedded in a video prior to encoding, after encoding, or during encoding.

SUMMARY

Methods and systems for invisible watermarking of images and video are disclosed. According to one embodiment, a method for watermarking video comprises selecting a block corresponding to a subset of pixels in a video frame. The block has quantized coefficients generated during encoding of the block. A modification function is applied to a candidate quantized coefficient (QC) in the block to incorporate a bit of a watermark message. The modification function is based on a set of configuration parameters.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings.

Figure 1:
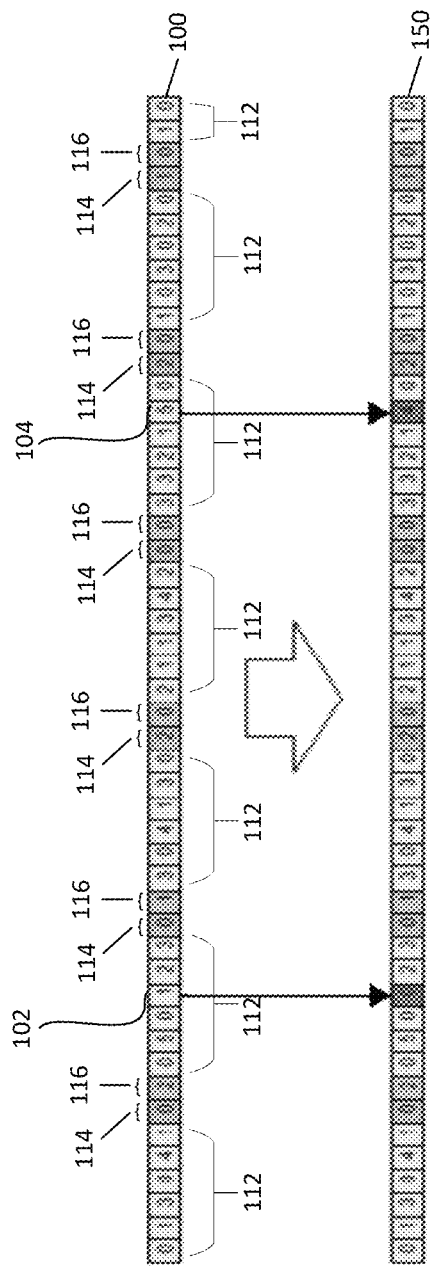
FIG. 1 shows an example bitstream obtained by encoding a video frame and a corresponding modified bitstream having embedded therein at least a part of a watermark message, according to one embodiment.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

The following disclosure provides different embodiments, or examples, for implementing different features of the subject matter. Specific examples of components and arrangements are described below to simplify the present disclosure. These are, of course, merely examples and are not intended to be limiting.

Methods and systems for invisible watermarking of images and video are disclosed. According to one embodiment, a method for watermarking video comprises selecting a block corresponding to a subset of pixels in a video frame. The block has quantized coefficients generated during encoding of the block. A modification function is applied to a candidate quantized coefficient (QC) in the block to incorporate a bit of a watermark message. The modification function is based on a set of configuration parameters.

Various embodiments of video watermarking systems/methods described herein feature embedding a watermark during encoding of the raw video. These embodiments generally include a quantized coefficients invisible watermark (QCIW) module that embeds a message of arbitrary, selectable length into a compressed video stream, by modifying certain quantized coefficients generated by computing a residual, transforming the residual to obtain transform coefficients, and quantizing the transform coefficients. This modification generally has only a negligible Video Quality (VQ) impact. The embedded watermark message can be used, for example, to indicate the encoder identity, the encoder version, the encoding date, the video stream title, and/or the device used to encode the video stream. This information can be used to copyright and watermark the coded video stream in a practically invisible way. Various embodiments described herein are compatible with many standard video decoders that may decode and display video streams without needing any special changes to the decoders. In other words, the modification of the quantization coefficients (QC) does not substantially affect the decoding process, and the distortion in the retrieved video is generally not noticeable.

Various embodiments of the video watermarking system described herein also use several configuration parameters that may be provided to and/or may be set during encoding. Some embodiments allow the parameter set to be embedded in the video stream using the same technique used for modifying the quantized coefficients. A modified video decoder can reproduce the embedded message (e.g., invisible watermark) using the embedded parameters that identify the source of encoding, i.e., the entity performing the encoding, and the process of the encoding and/or modification of the QCs.

Because one goal of watermarking is not to affect the video/visual quality (VQ) substantially, these parameters can be selected and/or manipulated to adjust the encoding and watermarking processes as necessary, so that a desired VQ is maintained while also providing a robust watermark. For example, the frequency at which a QC may be altered can be set using a frequency parameter that can be a part of the configuration parameters. The value of the frequency parameter may be set such that the VQ impact is negligible.

Many video compression standards, such as H.264, HEVC, VP9, MPEG, AV1, and others, specify a process which produces quantized coefficients that are losslessly entropy encoded and sent as the main component of the video stream together with headers, the modes, and the motion vectors (MVs). The headers encode general information about the stream and the video frame being encoded. The frame is partitioned into blocks and the modes indicate the granularity of the block partitioning and how the pixels in each block are predicted from their spatial or temporal neighbors.

The MVs are pointers to similar blocks in frames encoded in the past. The differences between predicted pixels and the original raw pixels from a given block are called the residuals. These residuals are transformed to the frequency domain, e.g., via a discrete cosine transform (DCT), to obtain transform coefficients, which are then quantized to obtain the quantized coefficients. This process is repeated for all pixel components for all the blocks until the entire frame is encoded.

The transformed and quantized residuals, MVs, modes, and other data, collectively known as "symbols" representing the encoded bitstream, are serially coded in a final entropy-based coding step, e.g., using arithmetic coding or content adaptive binary arithmetic coding (CABAC), to produce a final compressed bitstream. Various embodiments described herein can alter certain symbols, infrequently and only to a slight degree, so as not to produce a noticeable perturbation of the underlying encoded video. This alteration is used to insert a secret message (e.g., a watermark message), as shown in FIG. 1.

FIG. 1 shows an example bitstream obtained by encoding a video frame and a corresponding modified bitstream having embedded therein at least a part of a watermark message, according to one embodiment. The stream 100 depicted in FIG. 1 includes different types of symbols such as residuals 112 (that may be transformed and quantized), modes 114, and motion vectors 116. Two symbols 102, 104 in the stream 100 are identified and used to encode a portion of a secret message by altering the symbol values in a pattern or manner known to both a quantized coefficients invisible watermark (QCIW) encoder and QCIW decoder(s). In particular, the value of the QC symbol 102 is changed from "1" to "0" and the value of the QC symbol 104 is changed from "5" to "4." The modified symbols are included in the altered bitstream 150. Ordinary decoders may decode the altered bitstream 150 without decoding the secret message represented by the altered values of the symbols 102, 104, resulting in an output video stream that may be slightly different from the version obtained by decoding the unaltered bitstream 100. These differences are generally unperceivable to the viewer.

Figure 2A:
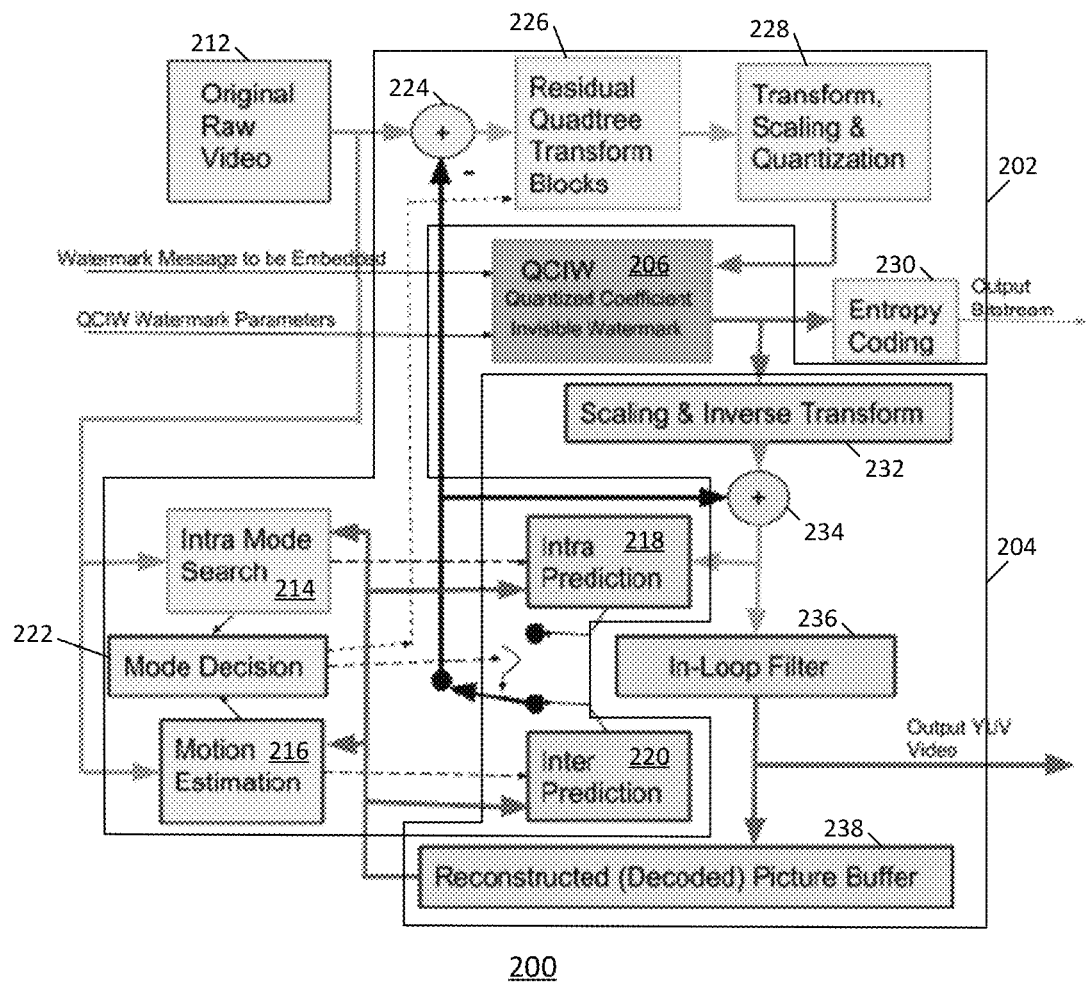
FIG. 2A is a block diagram of an encoder having a watermarking module, according to various embodiments.

FIG. 2A is a block diagram of an encoder having a watermarking module according to various embodiments. FIG. 2A shows an encoding and watermarking system 200 having an encoder 202. The system 200 also includes an optional built-in decoder 204 (e.g., the modules 218, 220, 232, 234, 236, and 238). The built-in decoder 204 may be similar to an external decoder (not shown) that would decode a bitstream produced by the system 200 and would display the video. In the displayed video, a watermark inserted by the system 200 would not be visible. A quantized coefficient invisible watermark (QCIW) module 206 is located between the encoder 202 and the decoder 204. The encoder 202 and the decoder 204 may be implemented according to the applicable encoding scheme or standard (e.g., H.264, HEVC, VP9, MPEG, AV1, etc.), and such implementations are known in the field of video encoding and decoding.

In general, raw, uncompressed, unencoded video signal is received at a receiver module 212 as a series of frames. Inter-frame and/or intra-frame prediction is then performed, which generally involves selecting an image block to be encoded, identifying a block in the same or another frame that is similar (in terms of pixel values) to the block to be encoded, and predicting pixels values for the block to be encoded, based on the identified similar block. Searching for a similar block within the frame containing the block to be encoded (intra mode search) may be accomplished at module 214. The prediction may be performed at modules 216, 218, 220. Whether to use inter-frame or intra-frame prediction may be determined at module 222. The information derived from these operations may be provided to the optional decoder 204.

A difference between a block in the unencoded video and the corresponding predicted block, also called a residual and indicated as residual blocks 216, is computed at a difference engine 224. The residuals are transformed into the frequency domain and are then quantized at module 228. Quantized coefficients (QCs) are entropy encoded at the entropy coder module 230 to obtain an encoded, compressed video signal (e.g., bitstream 100 depicted in FIG. 1).

In the system 200, however, the QC are first processed by the QCIW module 206, as discussed below, to provide modified QCs to the entropy coder 230, which produces a modified bitstream (e.g., bitstream 150 in FIG. 1). In addition, an inverse quantization/scaling and an inverse transform may be applied to the modified QCs at the optional module 232, to obtain a modified residual. Optionally, the predicted image block is then added to the modified residual in the optional summation module 234, and the output thereof may be filtered at the optional filter 236, to output a modified, unencoded video extracted from the modified QCs. The extracted (also called reconstructed) video may be stored in the optional buffer 238, and may be used to fine-tune various encoding operations described above, to improve the visual quality of the encoded modified bitstream produced by the system 200 (e.g., bitstream 150 in FIG. 1).

The QCIW module 206 uses the watermark message to be embedded and the watermarking (e.g., configuration) parameters to change the QCs slightly and infrequently, as further described below. The modified coefficients are used by the entropy coding module 230, which losslessly compresses the QCs into a bitstream conforming to the applicable video encoding scheme or standard. The modified coefficients may also be used by the optional decoder 204 and/or the encoder 202 to predict pixels of the spatially and/or temporally neighboring blocks during prediction thereof.

It should be noted that the determination of the encoding modes, MVs, and the quantized coefficients are controlled by the encoder 202 to balance the video quality produced by an external decoder (not shown) and the generated bit rate. In some cases, the encoder 202 may alter the quantized coefficients according to a quantization parameter (QP) that may be stored in the module 228, in order to improve the visual quality by improving the fidelity to the original pixels and/or to reduce the transmitted bit rate. In these cases, the QCIW module 206 further modifies these quantized coefficients in order to embed an invisible message used for watermarking. The frequency at which QC alteration occurs is low enough (e.g., every 16th 4×4 QC), so as not to interfere with regular encoder optimizations, making the impact of the modifications by the QCIW module 206 on the visual quality negligible.

Figure 2B:
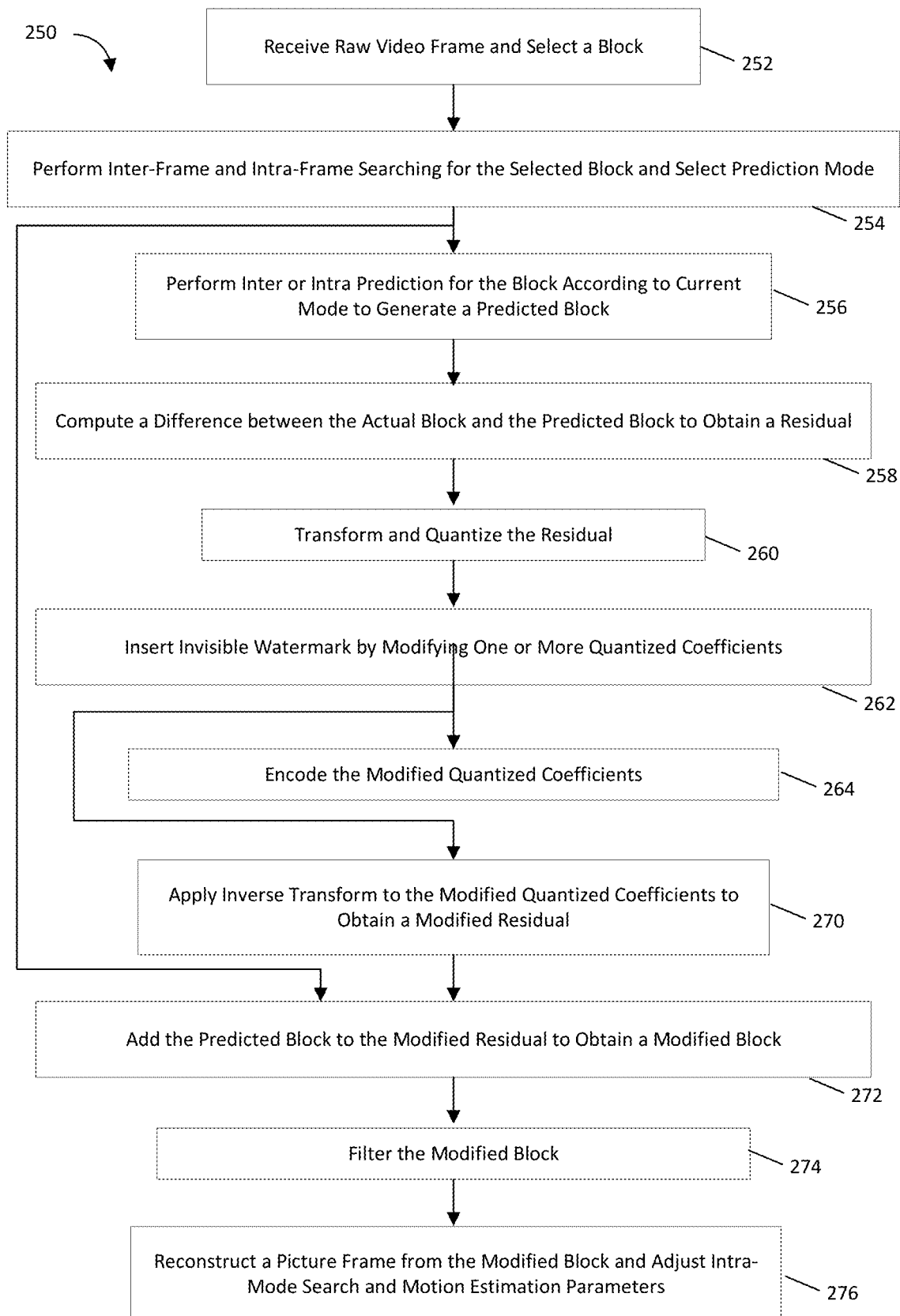
FIG. 2B is a flow chart of an encoding process that includes watermark insertion according to one embodiment, where the encoding process may be performed using the encoder shown in FIG. 2A.

FIG. 2B is a flow chart of an encoding process that includes watermark insertion according to one embodiment, where the encoding process may be performed using the encoder shown in FIG. 2A. With reference to FIG. 2B, in the process 250, frames of the original, raw video are received at step 252 and a block of pixels from a particular frame is selected. At step 254, intra-frame searching and inter-frame searching (also called motion estimation) is performed and, based on the search results, a prediction mode is selected. Based on the selected mode, inter-frame or intra-frame prediction is performed for the selected block at step 256, to obtain a predicted block.

At step 258, a difference between the predicted block and the actual selected block is computed to obtain a residual. The residual is transformed to the frequency domain and the transformed residual is quantized at step 260, to obtain one or more blocks of quantized coefficients (QCs). One or more bits of the selected watermark message are then added to the frame from which the block that is currently processed was selected, by modifying one or more quantized coefficients of that block at step 262, as further described below. At step 264, the modified QCs are encoded using entropy encoding to obtain a bitstream having at least a part of the watermark message.

The process 250 includes various decoding steps 270-276, but these steps are optional. In some embodiments, an invisible watermark can be included in the encoded bitstream as described above (steps 252-264) without performing the optional steps 270-276. At step 270, an inverse transform is applied to the modified QCs generated at step 262, to obtain a modified residual. The predicted block, that was generated at step 254, is added to the modified residual to obtain a modified block at step 272. The modified block is then filtered at step 274, and a picture frame or a part thereof corresponding to the selected block is reconstructed from the modified block, at step 276. The reconstructed picture can be somewhat different from a picture reconstructed from the unmodified QCs, in part due to the insertion of the watermark. In general, the difference between the two reconstructions may not be perceptible to a viewer, however, thus making the watermark invisible. Information derived during the reconstruction can be used to adjust the intra-frame and inter-frame searching parameters, and/or to adjust the quantization parameters.

Referring again to FIG. 2A, the encoder 202, as part of mode selection, may determine the Transform Block (TB) splits and sizes. In the HEVC Encoding Standard for example, sizes of split TBs may vary from 4×4 to 32×32 pixels. The residual, when transformed into the frequency domain by the module 228, is quantized per TB size by the module 228 to produce the quantized coefficients as an input to the QCIW module 206.

In different embodiments, the QCIW module 206 can operate on a transformed quantized block (TB) divided into blocks of sizes smaller or larger than 4×4. For the sake of convenience only, the discussion below relates to a 4×4 portion of a TB. According to one embodiment, the QCIW module 206 divides the TB received from the module 228 into 4×4 blocks, in a selected scan order. The quantized coefficients are optionally modified for certain 4×4 blocks to embed therein the watermark message as controlled by the QCIW module's input configuration parameters.

One parameter for the QCIW module 206 determines the selection of the 4×4 blocks into which certain bits of the message are embedded. Different embodiments feature one or more of the following options:

1. A frequency parameter determines how many 4×4 blocks may have potentially at least one coefficient bit modified. This frequency can directly impact the visual quality (VQ) of the output bitstream. At low frequencies (e.g., not less than every $4^{th}$, $10^{th}$, $16^{th}$, $50^{th}$, $64^{th}$, etc., 4×4 block), the impact is negligible. The configurable frequency can also indirectly make it harder to circumvent the watermarking process.
2. A block distribution parameter distributes within a bitstream the 4×4 blocks in which a QC may be modified pseudo-randomly, e.g., using Polynomial Linear Shift Registers with a starting pseudo-random seed. This parameter can be adjusted to improve the visual quality (also called video quality) (VQ) of the watermarked bitstream.
3. A block skip parameter causes a 4×4 block to be skipped when the total number of significant (e.g., non-zero coefficients, or coefficients having actual or absolute values at least equal to a specified significance value threshold, such as 2, 4, etc.) is larger than a specified significance count threshold (e.g., 2, 3 etc.), or if the block contains at least one coefficient having an absolute value larger than a value threshold (e.g., 1, 3, etc.). If any of these conditions is met, the 4×4 block would be skipped, i.e., the QCIW module 206 will not modify that block. Not modifying a block under such conditions can improve VQ of the output bitstream.
4. The scan/location parameter(s) specify how to map the watermark message bits to particular locations within a selected 4×4 block.

5. A repetition parameter specifies how many times a watermark message may be repeated per frame, or per independent Group of Pictures (GOP), or for the entire stream.

The encoder 202 may derive one or more of these configuration parameters. Alternatively or in addition, one or more of these configuration parameters may be provided to the encoder 202 or to the QCIW module 206 as system inputs.

Figure 3:
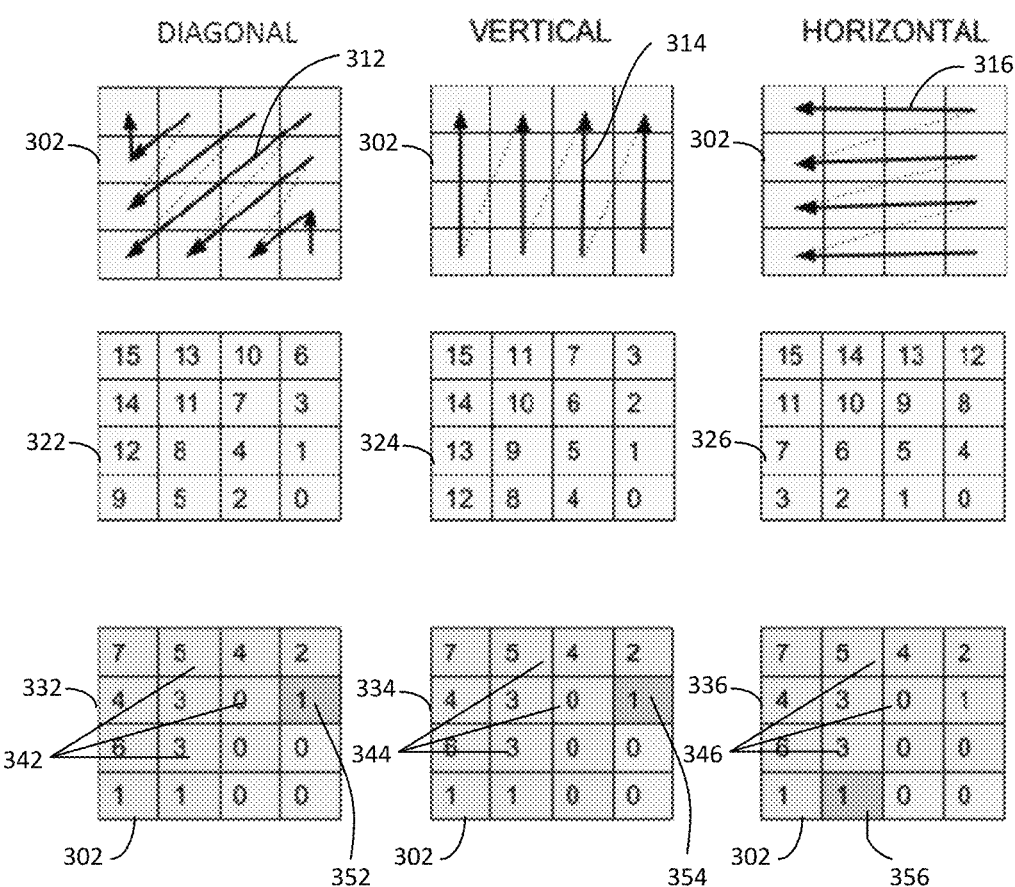
FIG. 3 illustrates scanning of a frame block for different exemplary scanning orders, according to one embodiment.

FIG. 3 illustrates scanning of a frame block according to different example scanning orders. With reference to FIG. 3, after a 4×4 block 302 is selected, the Quantized Coefficients (QC) therein are ordered in a selected scan order, according to some embodiments. The scan option and/or order may be specified per the scan/location parameter(s) or may be derived from the intra-frame search. For the 4×4 block 302, scans 312, 314, and 316 depict reverse diagonal, reverse vertical, and reverse horizontal scan orders, respectively. The coefficient numbering (from index 0 through index 15) for the three reverse scan orders 312, 314, 316 are shown in index blocks 322, 324, 326, respectively. The absolute values of the quantized coefficients are shown in value blocks 332, 334, 336. It can be seen that the absolute quantized coefficient (AQC) values 342, 344, 346 in the value blocks 332, 334, 336, respectively, for the selected 4×4 block 302, are the same regardless of the scanning order. The location of the first significant AQC depends, however, on the selected scanning order. Specifically, for the reverse diagonal scanning, the first AQC "1" at 352 corresponds to index "3" as can be seen in the index block 322. For the reverse vertical scanning, the first AQC "1" at 354 corresponds to index "2," as can be seen in the index block 324. For the reverse horizontal scanning, the first AQC "1" at 356 corresponds to index "2," as can be seen in the index block 326.

In some embodiments, the selected scan order is used to determine which QC may be modified for embedding therein a portion of the watermarking message. For example, according to the specified scan/location parameter(s), one option is to alter the first coefficient in a reversed scan order. In such cases, where a particular QC is to be targeted, the scan order is important.

In general, the QCIW module 206 (FIG. 2A) selects the QCs that may be changed to embed therein the bits of the watermark message. The QCIW decoder (not shown) may retrieve the message bits by applying the same selection process used by the QCIW encoder (i.e., an encoder having a QCIW module 206). The selection process is controlled by the corresponding QCIW input parameters, e.g., the scan/location parameter(s). The following examples illustrate some of the coefficient selection options used in different embodiments:
1. Least Significant Bit (LSB), so that the parity of the QCs in the 4×4 block is the same as the message bit. Thus, if the message bit is "1" and if the parity of the QCs of the 4×4 block is even, the LSB is flipped and, otherwise, the LSB is not modified. Likewise, if the message bit is "0" and the parity is odd, the LSB is flipped and, otherwise, the LSB is not modified. According to this scheme, the optional Sign Data Hiding (SDH) feature of the encoder must be disabled. SDH allows hiding or omission of the sign bit of a non-zero QC. To perform such hiding, the encoder may quantize the QCs in a group such that the sum of their absolute values is even when the sign bit that is to be omitted has the value 0. If the sign bit value is 1, the encoder may quantize the QCs in the group such that the sum of their absolute values is odd. SDH assumes that in a group of QCs, increasing or decreasing by one the value of at least one QC may not affect the visual quality and/or the bit rate significantly.
2. The first significant coefficient by absolute value i.e., a QC that has an absolute value that is non-zero or is at least equal to a specified value threshold (e.g., 1, 3, etc.), in reverse scan order, so that the parity of the absolute coefficient values (AQC parity) is the same as the message bit. If the AQC parity without modification is equal to the message bit, no change is needed. Otherwise the selected coefficient can be incremented or decremented by one to change the AQC parity. This option can be implemented with SDH. In some cases, more than one coefficient may need to be changed, however, to satisfy the requirements of both QCIW and SDH. Special attention is given when the QC selected for modification has a value of 1, and it is to be decremented, as that would change the location of the first significant coefficient (because the modified QC would have a value "0," making that QC non-significant). In some cases, when the SDH feature is enforced, the selected QC is modified and the QC before it in reverse scan order, which would have the value "0," is changed to "1."
3. LSB+1 bit of the first QC in reverse scan order, so that the parity of the 4×4 block is the same as the message bit. Instead of the first QC, the first significant QC, based on actual or absolute values, may be selected. This option is compatible with SDH and is relatively simple to implement compared to the other options, but may result in slightly lower VQ compared to the other options.

Figure 4A:
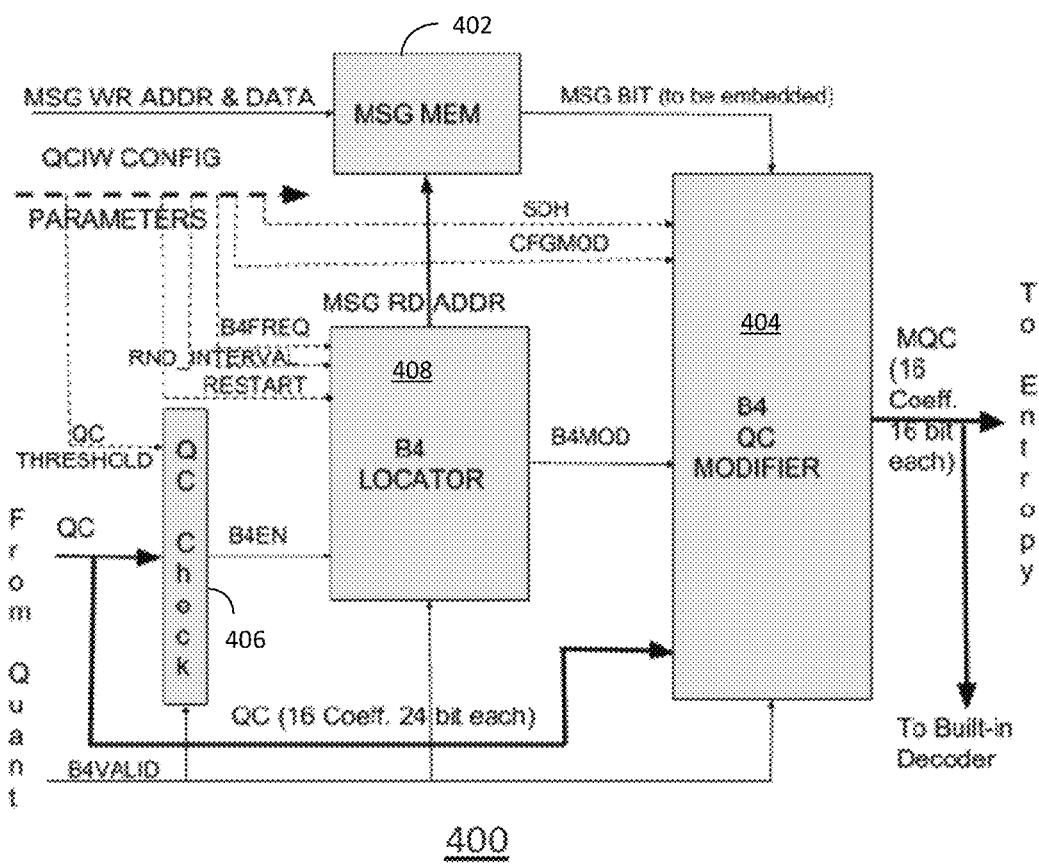
FIG. 4A is a block diagram of a watermarking module according to various embodiments.

FIG. 4A is a block diagram of a watermarking module according to various embodiments. With reference to FIG. 4A, an exemplary QCIW module 400, according to one embodiment, includes a message memory 402 for storing the watermark message to be embedded into a frame. The system level inputs that the QCIW module 400 may receive include the Message Memory Write Address and Data and the configuration parameters denoted QCIW Config Parameters. These inputs may be provided by a control processor that can access register(s) for the configuration parameters and the Message Memory 402. The data width of these inputs may be matched with the processor data width (e.g., 32 bits, 64 bits, etc.).

The Quantized Coefficients (QC) for the current 4×4 QC block (B4) are received from the Forward Quantizer (FQUANT) (e.g., module 228 in FIG. 2A) after the transform and quantization process. The Sign Data Hiding (SDH) is optionally applied to the QC block before the QWIC module 400 receives the block. SDH can be postponed and optionally performed in the B4 QC MODIFIER sub-module 404. The QC_CHECK sub-module 406 qualifies the current B4, i.e., determines whether B4 may be modified. For example, according to the QC Threshold parameter(s) the QC_CHECK sub-module 406 determines whether the current B4 has enough coefficients that are significant or non-zero and/or have absolute values above the specified threshold. For example, referring back to FIG. 3, the 4×4 block 302 has five values that are zero and 11 non-zero values. If the threshold specifying the minimum number of non-zero values is set to 8 or 10, the block 302 is a suitable candidate. If the threshold is set to 12, however, the block 302 is not a suitable candidate.

In some cases, the threshold for significant values may be set to the value "2," where an absolute value greater than or equal to 2 is considered significant. In such cases, the block 302 (FIG. 3) includes 8 significant values. If the threshold specifying the minimum number of significant values is set to 8, the block 302 is a suitable candidate. If the threshold is set to 10, however, the block 302 is not a suitable candidate.

If the threshold for the minimum absolute value is set to 5, the block 302 is a suitable candidate because the block 302 includes the absolute values 5 and 7. If the threshold for the minimum absolute value is set to 10, however, the block 302 is not a suitable candidate. Referring again to FIG. 4A, the B4EN output from this sub-module 406 indicates, when asserted, that the current B4 is a suitable candidate for modification.

The B4_LOCATOR sub-module 408 determines if the current B4 may be modified (according to certain other configuration parameters) so as to embed the current message bit therein. The Message Memory Read Address is generated by this sub-module 408 to access the current message bit from the message stored in the memory 402. In addition to the B4EN signal received from QC_CHECK 406 and B4_VALID signal received from FQUANT, the QCIW Config Parameters may also control whether B4 may be modified. For example, based on the values of the QCs in B4, the block B4 may be suitable for modification. The specified frequency of modification may require, however, that the current B4 be skipped. Likewise, the TB Distribution parameter may specify that the current B4 shall not be modified. Whether the current B4 may be modified is indicated by the output B4MOD. The B4FREQ Config Parameter controls the frequency of B4 selection/modification. The RND_INTERVAL Config Parameter provides random intervals for B4s that may be modified, resulting in a random location distribution of the modified TBs in the output stream. An internal sequencer keeps track of modified B4s and a message read pointer points to the next message bit to be embedded into the current or a subsequent B4. The states of the sequencer and/or the message read pointer may be reset with a RESTART signal.

The B4_QC_MODIFIER sub-module 404 performs the modification of the Quantized Coefficients to embed the current message bit therein. The SDH parameter enables the Sign Data Hiding to be performed together with the watermarking to achieve a high VQ. The maximum achievable VQ may be determined by performing a Rate Distortion Optimization process in the encoder. The sub-module 404 may post process the QC after SDH in a manner compliant with the frequency, block distribution, block skip, scan/location, and/or repetition parameters. In various embodiments, the input coefficients have 24 bit fractional precision that may be used to determine which coefficient modification may cause less VQ impact. The output of the QCIW module 400 is the MQC which, in various embodiments, is the normative 16-bit Quantized Coefficients for the potentially modified B4. The output MQC is forwarded to the Entropy module (e.g., the module 230 in FIG. 2A) and may also be forwarded to the optional built in decoder (e.g., the decoder 204 in FIG. 2A) starting with inverse quantization followed by inverse transform, optionally performed (e.g., module 232 in FIG. 2A), to generate the reconstructed pixels.

Figure 4B:
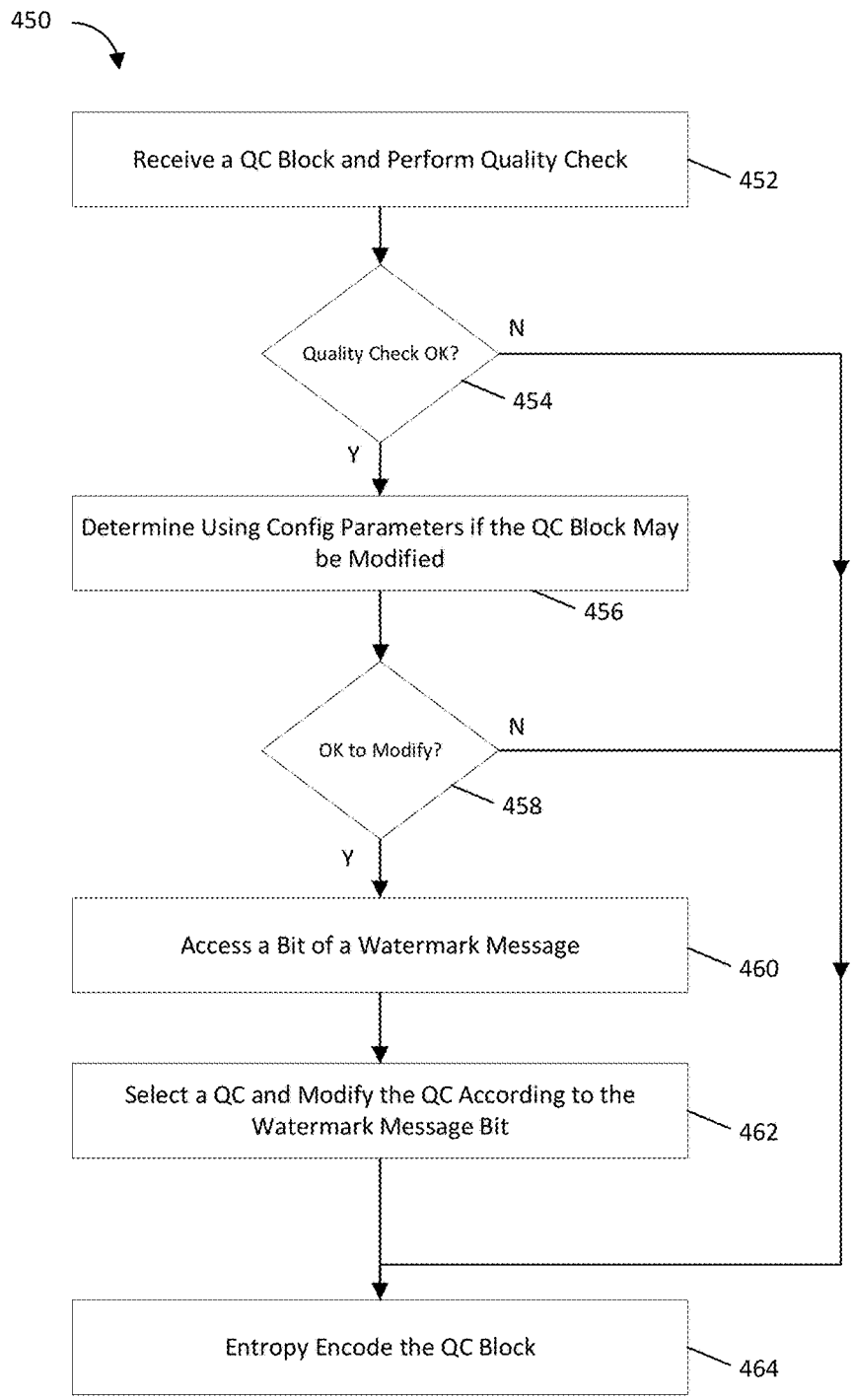
FIG. 4B is a flow chart of a watermark insertion process according to one embodiment, where the process may be performed using the watermarking module shown in FIG. 4A.

FIG. 4B is a flow chart of a watermark insertion process according to one embodiment, where the process may be performed using the watermarking module shown in FIG. 4A. With reference to FIG. 4B, in the process 450, a QC block is received at step 452. One or more quality checks, e.g., determining whether the block may be modified based on the properties of the coefficients in the block, are also determined at step 452. These quality check(s) include whether the block has enough coefficients that are significant or non-zero and/or have absolute values above the specified threshold, as described above using the block 302 (FIG. 3) as an example.

If step 454 determines that the quality check is acceptable, in step 456 it is determined further whether the QC block may be modified. The determination in the step 456 is based on the configuration parameter(s) such as one or more of the frequency, block distribution, block skip, scan/location, and repetition parameters. If step 458 determines that it is acceptable to modify the QC block, one or more bits of the watermark message are accessed at step 460. Using the configuration parameters, one or more quantized coefficients in the QC block are selected for modification in step 462. Thereafter, using the bit(s) of the watermark message, one or more selected QCs in the block are modified, as described above, in step 462.

The modified QC block is then encoded using entropy encoding at step 464. If it is determined in steps 454 or 458 that the QC block is not to be modified, the unmodified QC block is entropy encoded at step 464.

There are several advantages of the different embodiments described herein over many other image and video watermarking techniques. These advantages include:

1. Protection and identification of the source of the video encoder (i.e., the encoding entity), and production of a high quality compressed bitstream. In contrast, many other watermarking techniques are geared to protect the identity and the source, and/or the content, of the original image or video stream. As various embodiments described herein insert watermarks during encoding, these embodiments are relatively more robust against commonly known techniques for defeating or circumventing watermarks (e.g., pre-encoding, post-decoding filtering, image alterations, etc.).

2. A system according to the different embodiments described herein can operate independently from the video source. The embedded watermark message is also invisible when the decoded video is examined or displayed, unless a special decoder that is aware of not only the inclusion of the watermark(s) but also the process of embedding the watermark(s) and/or the configuration parameters used by the process.

3. Because the altered quantized transform coefficients may be used by the encoder to determine the modes, motion vectors, and/or other encoding parameters, which can impact the quantization of subsequent blocks, any attempt to remove or change the embedded message can cause severe visual artifacts in the decoded and displayed video making it effectively unusable, and this improving the robustness of watermarking.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method for watermarking video, the method comprising:
selecting a block corresponding to a subset of pixels in a video frame, the block having quantized coefficients generated during encoding of the block; and
applying a modification function to a candidate quantized coefficient (QC) in the block to incorporate a bit of a watermark message, wherein the modification function is based on a set of configuration parameters.

2. The method of claim 1, wherein an encoding process for the encoding of the block comprises a standardized encoding process.

3. The method of claim 1, wherein size of the block in terms of quantized coefficients is 4×4, 8×8, 16×16, or 32×32.

4. The method of claim 1, wherein the set of configuration parameters includes one or more of:
a block qualification parameter;
a frequency parameter;
a block distribution parameter;
a scanning order parameter;
a coefficient location parameter; or
a watermark message repetition parameter.

5. The method of claim 4, wherein the block qualification parameter comprises:
a value threshold for values of the quantized coefficients; or
a count threshold for quantized coefficients.

6. The method of claim 5, further comprising validating the block prior to applying the modification function by determining:
whether a number of significant coefficients in the block is at least equal to the count threshold: or
whether at least one quantized coefficient in the block has a value greater than the value threshold.

7. The method of claim 4, further comprising validating the block prior to applying the modification function by determining one or more of:
a rate of modification of blocks in the frame after modifying the selected block by applying the modification function is less than or equal to the frequency parameter; or
a location of the block in the frame complies with acceptable locations in the frame, the acceptable locations being defined by the block distribution parameter.

8. The method of claim 7, wherein the block distribution parameter defines the acceptable locations as a pseudorandom sequence based on a specified seed.

9. The method of claim 4, wherein:
the scanning order comprises a reverse diagonal order, or a reverse vertical order, or a reverse horizontal order; and
the candidate QC is selected in the scanning order.

10. The method of claim 9, wherein the candidate QC is one of:
k-th QC in the scanning order, k ranging from 1 through size of the block; or
k-th QC in the scanning order and having a value greater than a specified value threshold.

11. The method of claim 4, further comprising:
repeating the selecting and applying steps with respect to a plurality of blocks in the frame until each bit of the watermark message is embedded in the frame a number of times specified by the watermark message repetition parameter.

12. The method of claim 1, wherein applying the modification function comprises:
determining parity of a binary representation of the candidate QC;
comparing the parity with the watermark message bit; and
incrementing or decrementing the QC when the comparison is false and preserving the QC when the comparison is true.

13. The method of claim 1, further comprising entropy encoding the block.

14. The method of claim 1, further comprising:
repeating the selecting and applying steps with respect to a plurality of blocks in the frame, repeated application of the applying step generating a plurality of modified blocks;
decoding the plurality of modified blocks; and
adjusting using information produced from the decoding one or more configuration parameters or one or more encoding parameter used for the encoding.

15. The method of claim 1, further comprising:
repeating the selecting and applying steps with respect to a plurality of blocks in the frame; and
replacing during the repeated application of the applying step, the watermark message with another message comprising one or more parameters from the set of configuration parameters, so that the one or more parameters are embedded in the frame.

16. A video watermarking system comprising:
a processor; and
a memory in communication with the processor and comprising instructions which, when executed by the processor, program the processor to:
select a block corresponding to a subset of pixels in a video frame, the block having quantized coefficients generated during encoding of the block; and
apply a modification function to a candidate quantized coefficient (QC) in the block to incorporate a bit of a watermark message, wherein the modification function is based on a set of configuration parameters.

17. The system of claim 16, wherein the instructions program the processor to perform the encoding of the block based on a standardized encoding process.

18. The system of claim 16, wherein size of the block in terms of quantized coefficients is 4×4, 8×8, 16×16, or 32×32.

19. The system of claim 16, wherein the set of configuration parameters includes one or more of:
a block qualification parameter;
a frequency parameter;
a block distribution parameter;
a scanning order parameter;
a coefficient location parameter; or
a watermark message repetition parameter.

20. The system of claim 19, wherein the block qualification parameter comprises:
a value threshold for values of the quantized coefficients; or
a count threshold for quantized coefficients.

21. The system of claim 20, wherein the instructions further program the processor to validate the block prior to applying the modification function by determining:
whether a number of significant coefficients in the block is at least equal to the count threshold: or whether at least one quantized coefficient in the block has a value greater than the value threshold.

22. The system of claim 19, wherein the instructions further program the processor to validate the block prior to applying the modification function by determining one or more of:
  a rate of modification of blocks in the frame after modifying the selected block by applying the modification function is less than or equal to the frequency parameter; or
  a location of the block in the frame complies with acceptable locations in the frame, the acceptable locations being defined by the block distribution parameter.

23. The system of claim 22, wherein the block distribution parameter defines the acceptable locations as a pseudorandom sequence based on a specified seed.

24. The system of claim 19, wherein:
  the scanning order comprises a reverse diagonal order, or a reverse vertical order, or a reverse horizontal order; and
  the instructions program the processor to select the candidate QC in the scanning order.

25. The system of claim 24, wherein the candidate QC is one of:
  k-th QC in the scanning order, k ranging from 1 through size of the block; or
  k-th QC in the scanning order and having a value greater than a specified value threshold.

26. The system of claim 19, wherein the instructions further program the processor to:
  repeat the select and apply operations with respect to a plurality of blocks in the frame until each bit of the watermark message is embedded in the frame a number of times specified by the watermark message repetition parameter.

27. The system of claim 16, wherein to apply the modification function the instructions program the processor to:
  determine parity of a binary representation of the candidate QC;
  compare the parity with the watermark message bit; and
  increment or decrement the QC when the comparison is false and preserving the QC when the comparison is true.

28. The system of claim 16, wherein the instructions further program the processor to entropy encode the block.

29. The system of claim 16, wherein the instructions further program the process to:
  repeat the select and apply operations with respect to a plurality of blocks in the frame, repeated apply operation generating a plurality of modified blocks;
  decode the plurality of modified blocks; and
  adjust using information produced from the decode operation one or more configuration parameters or one or more encoding parameter used for the encoding.

30. The system of claim 16, wherein the instructions further program the processor to:
  repeat the select and apply operations with respect to a plurality of blocks in the frame; and
  replace during the repeated apply operation, the watermark message with another message comprising one or more parameters from the set of configuration parameters, so that the one or more parameters are embedded in the frame.

* * * * *